United States Patent [19]

Usala

[11] Patent Number: 4,613,648

[45] Date of Patent: * Sep. 23, 1986

[54] CASTABLE CERAMIC COMPOSITIONS

[75] Inventor: Hugo R. Usala, Wilmington, Del.

[73] Assignee: E. I. Du Pont de Nemours and Company, Wilmington, Del.

[ * ] Notice: The portion of the term of this patent subsequent to Aug. 20, 2002 has been disclaimed.

[21] Appl. No.: 737,549

[22] Filed: May 24, 1985

Related U.S. Application Data

[60] Division of Ser. No. 594,701, Mar. 29, 1984, Pat. No. 4,536,535, which is a continuation-in-part of Ser. No. 501,978, Jun. 7, 1983, abandoned.

[51] Int. Cl.$^4$ ............................................. C08L 39/00
[52] U.S. Cl. .................................... 524/555; 524/560; 524/561
[58] Field of Search ......................... 524/555, 560, 561

[56] References Cited

U.S. PATENT DOCUMENTS

| | | | |
|---|---|---|---|
| 3,125,618 | 3/1964 | Levinson | 264/63 |
| 3,717,487 | 2/1973 | Hurley et al. | 106/48 |
| 3,991,029 | 11/1976 | Adelman | 260/29.6 |
| 4,010,133 | 3/1977 | Nakayama | 524/423 |
| 4,536,535 | 8/1985 | Usala | 524/403 |

OTHER PUBLICATIONS

Chem. Abs. vol. 100, No. 16, Apr. 1984, p. 122116w.
Chem, Abs. vol. 94, No. 6 (Feb. 9, 1981), p. 31722g.
Chem. Abs. vol. 94 No. 16 (Apr. 16, 1981), p. 126226n.
Chem. Abs. vol. 94, No. 22 (Jun. 1, 1981), p. 184388c.
Chem. Abs. vol. 91, No. 20 (Nov. 12, 1979), p. 162149m.
Chem. Abs. vol. 92, No. 6 (Feb. 11, 1980), p. 46264s.
Chem. Abs. vol. 93, No. 14 (Oct. 6, 1980), p. 136763d.
Chem. Abs. vol. 95, No. 6 (Aug. 10, 1981), p. 47737x.
Chem. Abs. vol. 91, No. 14 (Oct. 1, 1979), p. 111611y.
Chem. Abs. vol. 91, No. 14 (Oct. 1, 1979), p. 111625f.
Chem. Abs. vol. 89, No. 22 (Nov. 27, 1978), p. 184664m.
Chem. Abs. vol. 91, No. 4 (Jul. 23, 1979), p. 26075q.
Chem. Abs. Vol. 92, No. 4 (Jan. 28, 1980), p. 27404w.
Chem. Abs. vol. 86, No. 20 (May 16, 1977), p. 149658d.
Chem. Abs. vol. 87, No. 8 (Aug. 22, 1977), p. 53905b.
Chem. Abs. vol. 89, No. 14 (Oct. 2, 1978), p. 116716e.
Chem. Abs. vol. 83, No. 83, No. 16 (Oct. 20, 1975), p. 136292t.
Chem. Abs. vol. 84, No. 14 (Apr. 5, 1976), p. 94516g.
Chem. Abs. vol. 84, No. 16 (Apr. 19, 1976), p. 110396a.
Chem. Abs. vol. 77, No. 12 (Sep. 18, 1972), p. 75969w.
Chem. Abs. vol. 81, No. 18 (Nov. 4, 1974), p. 110555g.
Chem. Abs. vol. 82, No. 26 (Jun. 30, 1975), p. 179630y.

*Primary Examiner*—Joseph L. Schofer
*Assistant Examiner*—J. M. Reddick

[57] ABSTRACT

A castable ceramic composition comprising finely divided particles of ceramic solids dispersed in a solution of alkyl acrylate/alkyl methacrylate/carboxylic acid or amine multipolymer in solvent. The ratio of the weight average and number average molecular weights of the multipolymer must be from 2 to 5.5.

8 Claims, No Drawings

CASTABLE CERAMIC COMPOSITIONS

CROSS REFERENCE TO RELATED APPLICATION

This application is a divisional of prior application Ser. No. 594,701 filed Mar. 29, 1984, now U.S. Pat. No. 4,536,535, which is a continuation-in-part of U.S. patent application Ser. No. 501,978 filed June 7, 1983, and now abandoned.

FIELD OF INVENTION

The invention relates to castable ceramic compositions and, in particular, to such compositions in which the ceramic component is a dielectric material.

BACKGROUND OF THE INVENTION

Because of their high volumetric efficiency and thus their small size, multilayer capacitors (MLC's) are the most widely used form of ceramic capacitors for thick film hybrid microelectronic systems. These capacitors are fabricated by stacking and cofiring thin sheets of ceramic substrate on which an appropriate electrode pattern is printed. Each patterned layer is offset from the adjoining layers in such manner that the electrode layers are exposed alternately at each end of the assemblage. The exposed edges of the electrode pattern are coated with a conductive material which electrically connects all the layers of the structure, thus forming a group of parallel connected capacitors within the laminated structure. Capacitors of this type are frequently referred to as monolithic capacitors.

The thin sheets of ceramic substrate used for the fabrication of MLC's are commonly referred to as "green tapes" and are comprised of a thin layer of finely divided dielectric particles which are bound together by an organic polymeric material. Unfired green tapes are prepared by slip casting a slurry of the dielectric particles dispersed in a solution of polymer, plasticizer and solvent onto a carrier such as polypropylene. Mylar ® polyester film or stainless steel and then adjusting the thickness of the cast film by passing the cast slurry under a doctor blade.

A wide variety of capacitor materials can be fabricated in this way, including $TiO_2$-glass $(BaSr)TiO_3$ $(Ba,Pb)TiO_3$-glass, $PbZrO_3TiO_3$-$BaTiO_3$-Pb monosilicate glass, $BaTiO_3$ $Bi_2O_3$, ZnO, $BaTiO_3$-Cd borosilicate glass, $BaTiO_3$-$BaAl_2$-$SiO_8$, $BaTiO_3$-$Pb_2Bi_4Ti_5O_{18}$ and countless others.

In the past, various polymeric materials have been employed as the binder for green tapes, e.g., poly (vinyl butyral), poly (vinyl acetate), poly (vinyl alcohol), cellulosic polymers such as methyl cellulose, ethyl cellulose, hydroxy ethyl cellulose, methylhydroxy ethyl cellulose, atactic polypropylene, polyethylene, silicon polymers such as poly (methyl siloxane), poly (methyl phenyl siloxane), polystyrene, butadiene/styrene copolymer, polystyrene, poly (vinyl pyrrolidone), polyamides, high molecular weight polyethers, copolymers of ethylene oxide and propylene oxide, polyacrylamides, and various acrylic polymers such as sodium polyacrylate, poly (lower alkyl acrylates), poly (lower alkyl methacrylates) and various copolymers and multipolymers of lower alkyl acrylates and methacrylates. Copolymers of ethyl methacrylate and methyl acrylate and terpolymers of ethyl acrylate, methyl methacrylate and methacrylic acid have been previously been used as binders for slip casting materials.

In large part because of the engineering characteristics of slip casting equipment, it is preferred that the ceramic dispersion (slip) for casting dielectric films fall within the viscosity range of 100–4000 cp and preferably 500–3000 cp (Brookfield LVT Viscometer No. 2 spindle, 6 rpm, 25° C.). Within these viscosity limits, it is preferred to employ a casting slip which contains the highest possible amount of dielectric material and the least amount of polymeric binder and solvent. By this means, the amount of material which must be removed by pyrolysis can be kept to a minimum and problems with delamination of the layers are reduced. Heretofore, this has been a persistent problem for the reason that polymers which have sufficiently high molecular weight to provide adequate tape toughness and yet permit the use of relatively low amounts of binder are too high in viscosity. This is important in that the high viscosity of the polymer limits the amount of dielectric solids which can be used. In turn, this increases the ratio of organics to dielectric solids, which means that more organic materials must be pyrolyzed. On the other hand, polymers with low enough molecular weight to give suitably low viscosity and therefore higher amounts of dielectric solids yield layers which are too brittle.

SUMMARY OF THE INVENTION

The above described shortcomings of the rheological properties of prior art ceramic dispersions which are to be used as casting slips can be substantially overcome by the invention which, in its primary aspect, is directed to a castable ceramic composition comprising a dispersion of:

(a) finely divided particles of ceramic solids in a solution of
(b) a mixture of compatible multipolymers of 0–100% wt. $C_{1-8}$ alkyl methacrylate, 100–0% wt. $C_{1-8}$ alkyl acrylate and 0–5% wt. ethylenically unsaturated carboxylic acid or amine dissolved in
(c) a nonaqueous organic solvent, the multipolymer being further characterized as having a number average molecular weight ($M_n$) of 50,000 to 100,000, a weight average molecular weight ($M_w$) of 150,000 to 350,000, the ratio of $M_w$ to $M_n$ being no greater than 5.5, the total amount of unsaturated carboxylic acid or amine in the multipolymer mixture is 0.2–2.0% wt., and the glass transition temperature of the polymer and plasticizer therein, if any, is −30° to +45° C.

In a second aspect, the invention is directed to a method of making green tape which comprises casting a thin layer of the above described composition onto a flexible substrate, such as a steel belt or polymeric film, and heating the cast layer to remove volatile solvent therefrom.

In a third aspect, the invention is directed to capacitors made by laminating and cofiring a plurality of the above described green tape layers on which an appropriate electrode pattern has been printed in an offset manner such that the edges of the printed electrodes from alternating layers are exposed at opposite ends of the laminated structure and the exposed ends of the patterned electrodes are each connected electrically by means of a conductive coating thereon.

DETAILED DESCRIPTION OF THE INVENTION

A. Ceramic Solids

The invention is applicable to virtually any high melting inorganic solid material. However, it is particularly suitable for making castable dispersions of dielectric solids such as titanates, zirconates and stannates. It is also applicable to precursors of such materials, i.e., solid materials which upon firing are converted to dielectric solids and to mixtures of any of these.

When the composition of the invention is to be used for slip casting, it is preferred that the particles not exceed 15 µm in size and preferably not more than 5 µm. On the other hand, it is preferred that the particles be no smaller than 0.1 µm. To obtain even better burnout characteristics, it is preferred that the surface area of the particles be at least 1 m$^2$/g and preferably at least 4 m$^2$/g. A particle surface area of 3–6 m$^2$/g has been shown to be quite satisfactory in most applications. Still higher particle surface areas, e.g. 10 m$^2$/g or higher, can be used, but their benefit must be balanced against the fact that higher surface area particles require more organic medium to obtain a given dispersion viscosity. For this reason, average particle surface area is preferred to be 3–8 m$^2$/g.

Among the many dielectric solids which are likely to be used in the invention are $BaTiO_3$, $CaTiO_3$, $SrTiO_3$, $PbTiO_3$, $CaZrO_3$, $BaZrO_2$, $MnO$, $Fe_2O_3$, alumina, silica and various glass frits, $CaSnO_3$, $BaSnO_3$, $Bi_2O_3$, $BiTiO_3$, $BiSnO_3$, kyanite, mullite, forsterite and zircon. The invention is also very effective as binder for low-fire dielectric materials such as those disclosed in U.S. Pat. Nos. 4,048,546, 4,063,341 and 4,228,482 to Bouchard.

As will be apparent to those skilled in the ceramic arts, the exact composition of the ceramic solids to be used in the composition of the invention is not ordinarily critical in the rheological sense so long as the materials are chemically inert with respect to the solution in which they are dispersed. It is also preferred that the ceramic solids not have swelling characteristics in the organic dispersion since the rheological properties of the dispersion may be substantially changed thereby.

B. Polymeric Binder

As set out hereinabove, the binder component of the invention dispersion is a mixture of compatible multipolymers of 0–100% wt. $C_{1-8}$ alkyl methacrylate, 100–0% wt. $C_{1-8}$ alkyl acrylate and 0–5% wt. ethylenically unsaturated carboxylic acid or amine which is further characterized as having a number average molecular weight ($M_n$) of 50,000 to 100,000, a weight average molecular weight ($M_w$) of 150,000 to 350,000, the ratio of $M_w$ to $M_n$ being no greater than 5.5, the total amount of unsaturated carboxylic acid or amine in the multipolymer mixture is 0.2–2.0% wt and the glass transition temperature of the polymer and plasticizer therein, if any, is −30° to +45° C.

The above described polymers are random copolymers and include higher multipolymers as well as terpolymers so long as the above-recited three basic comonomers fall within the indicated proportions. The relative quantity of carboxylic acid or amine distributed along the polymer chains is quite important. In particular, it has been found that at least 0.2% wt. of monomers containing the functional moieties are required in the polymer mixture to obtain adequate dispersibility of the ceramic solids and at least 0.5% wt. is preferred. On the other hand, it is necessary that the comonomers containing functional moieties not exceed 5.0% wt. of any one polymer or 2.0% in the polymer mixture to avoid flocculation of the dispersed ceramic solids. In some instances it has been observed that polymer mixtures having as low as 1.8% acid-containing monomers may be borderline or even unsatisfactory with respect to dispersion characteristics. In most instances of this kind, such polymers can nevertheless still be used in the invention by employing a more polar solvent. Thus, while a polymer mixture containing as much as 2.0% monomer containing functional groups can be used, such polymer mixtures having only 1.5% functional monomers are preferred. No more than 1.0% wt. of such functional monomers is still further preferred. It is also preferred for the same reason that none of the polymers contained in the polymeric mixture contains more than 5.0% wt. functional comonomer. Moreover, in order to obtain adequate dispersibility, it is preferred that none of the polymers contains less than 0.2% wt. functional monomers. Thus, the polymeric binder can be a mixture of polymers, some of which contain no functional moieties at all and some of which contain as much as 5.0% wt. functional comonomers so long as the content of functional comonomers in the total mixture is within the range of 0.2–2.0% wt. On the other hand, it is preferred that the polymeric binder be comprised entirely of acrylic polymers as defined above which contain 0.2–2.0% wt. functional comonomer.

In any event, the polymers which constitute the polymeric binder must all be compatible. By this is meant that a clear transparent film is formed when solvent is removed from a solution of the polymers in a mutual solvent. That is, the polymeric mixture is a single phase.

Suitable copolymerizable carboxylic acids include ethylenically unsaturated $C_{3-6}$ monocarboxylic acids such as acrylic, methacrylic and crotonic acids and $C_{4-10}$ dicarboxylic acids such as fumaric, itaconic, citraconic, vinyl succinic and maleic acids as well as their half esters and, where appropriate, their anhydrides and mixtures thereof, so long as such monomers constitute at least 0.2 and preferably 0.5% wt. of the polymer.

It is, of course, recognized that certain amine constituents cannot be incorporated in the chain directly by copolymerization of the amine-containing monomer but may be incorporated indirectly by postpolymerization reaction of a pendant reactive moiety of the polymer chain. Illustrative of this are primary amines which can be added by reaction of glycidyl compounds with pendant carboxylic acid groups in the presence of ammonia. Thus, as used herein, the term "ethylenically unsaturated amine" is intended to include polymers derived from both amine-containing comonomers as well as other comonomers which have been postpolymerizationally reacted to form amine groups thereon. Primary, secondary and tertiary amines are each effective in a similar manner. Suitable comonomers for direct incorporation of pendant amine groups into the binder polymer chain include diethylamino ethyl methacrylate, dimethyl amino ethyl methacrylate, and t-butylamino ethyl methacrylate. Suitable comonomers which yield pendant functional moieties suitable for postpolymerization reaction to incorporate amine functionality include the above described ethylenically unsaturated vic. epoxides such as glycidyl acrylate or glycidyl methacrylate.

It is quite possible for the polymeric binder component of the invention to contain up to 100% wt. of either acrylic or methacrylic monomers. Nevertheless, within the above described limits for the nonacidic comonomers, it is preferred that the alkyl methacrylate constitute 40-80% wt. of the copolymer and alkyl acrylate 60-20% wt. of the copolymer. A weight ratio of 1.5-2.5:1 alkyl methacrylate to alkyl acrylate is preferred and a ratio of 1.5-2.0:1 is especially preferred.

The polymeric binder can contain up to about 10% wt. of nonacrylic and nonacidic comonomers such as styrene, acrylonitrile, vinyl acetate, acrylamide and the like, so long as the previously discussed compositional criteria are met as well as the physical criteria mentioned below. However, it is preferred to use not more than about 5% wt. of such monomers. At present, the use of such other comonomers is not known to add to the efficacy of the copolymers in their application to the invention. However, such comonomers in the above limited amounts do not detract from the effectiveness of the polymers so long as all the compositional and physical property criteria are met.

In addition to the above described compositional parameters, certain physical parameters of the polymeric binder have been observed to have quite unexpected criticality in the composition of the invention.

In particular, it has been found that both the weight average molecular weight ($M_w$) and the number average molecular weight ($M_n$) of the polymer as well as the ratio of these two properties must be within quite narrowly defined limits to realize the advantages of the invention. It is required that the polymeric binder be within the above described limits of number average molecular weight to have sufficient strength properties. However, it is also necessary that the polymeric binder be within the above defined limits of weight average molecular weight to have sufficiently low viscosity. Furthermore, it has been quite unexpectedly found that the ratio of these two properties ($M_w/M_n$) must be no greater than 5.5 and preferably no greater than 4.0. It is preferred to use polymers in which the ratio of $M_w$ to $M_n$ is as small as possible, that is, polymers in which the ratio $M_w/M_n$ is as low as 1.5 or, ideally, approaches 1.0. However, such polymers are not available with current commercial-scale polymerization technology.

Though suitable $M_n$ values for the polymeric binder are found throughout the relatively narrow range of 50,000 to 100,000, it is preferred that $M_n$ be from 60,000 to 80,000. Similarly, suitable $M_w$ values for the polymeric binder are found throughout the range of 150,000 to 350,000. It is preferred, however, that $M_w$ be from 200,000 to 300,000.

In addition to the foregoing physical criteria, it is necessary for quite practical reasons of applicability that the glass transition temperature ($T_g$) of the binder polymer including any plasticizer therein be at least −30° C. but no more than +45° C. It is preferred that the $T_g$ of the binder, including any plasticizer which it may contain, be from −20° to +20° C. When $T_g$ is above 45° C., the solvent-free dispersion tends to have quite low adhesion to other layers and to be too brittle.

Though polymers meeting all of these very special criteria were not heretofore known, they can nevertheless be made by those skilled in the art of acrylate polymerization by conventional solution polymerization techniques. Typically, such acidic acrylate polymers are prepared by combining an alpha-beta-ethylenically unsaturated acid with one or more copolymerizable vinyl monomers in a relatively low boiling (75°-150° C.) organic solvent to obtain a 20 to 60% solution of the monomer mixture, then subsequently causing the monomers to polymerize by the addition of a polymerization catalyst and heating the mixture at the reflux temperature of the solution at atmospheric pressure. After the polymerization reaction is essentially complete, the resulting acid polymer solution is cooled to room temperature and samples are removed to determine the viscosity, molecular weight, acid equivalent, etc. of the polymer.

To obtain better binding efficiency, it is preferred to use at least 2% wt. polymer binder for 98% wt. ceramic solids. At least 5% wt. polymer binder is still further preferred. The amount of binder is dependent in part on the surface area of the ceramic solid particles. In general, high surface area ceramic solids will require higher amounts of organics.

C. Organic Medium

The organic medium in which the ceramic solids are dispersed consists of the polymeric binder which is dissolved in a volatile organic solvent and optionally, other dissolved materials such as plasticizers, release agents, dispersing agents, thixotropic agents, stripping agents, antifouling agents and wetting agents.

It will be recognized that, by adjusting the rheological properties of the dispersions of the invention and by changing the solvent component of the organic medium, the invention compositions can be applied to substrates by others methods than casting, e.g. by screen printing. When the compositions are applied by screen printing, the conventional organic media materials used for thick film materials can be used so long as the acrylic polymers are completely soluble therein at application temperatures.

For casting solutions, the solvent component of the organic medium is chosen so as to obtain complete solution therein of the polymer and sufficiently high volatility to enable the solvent to be evaporated from the dispersion by the application of relatively low levels of heat at atmospheric pressure. In addition, the solvent must boil well below the boiling point and decomposition temperature of any other additives contained in the organic medium. Thus, solvents having atmospheric boiling points below 150° C. are used most frequently. Such solvents include benzene, acetone, xylene, methanol, ethanol, methyl ethyl ketone, 1,1,1-trichloroethane, tetrachloroethylene, amyl acetate, 2,2,4-triethylpentanediol-1,3-monoisobutyrate, toluene, methylene chloride, 2-propanol, and Freon®TF (trichlorotrifluoroethane).

Often, however, it may be desired to apply the compositions of the invention as a thick film paste by such techniques as screen printing. In this event, the compositions must have appropriate viscosity so that they can be passed through the screen readily. In addition, they should be thioxotropic in order that they set up rapidly after being screened, thereby giving good resolution. While the rheological properties are of primary importance, the organic medium is preferably formulated also to give appropriate wettability of the solids and the substrate, good drying rate, dried film strength sufficient to withstand rough handling and good firing properties. Satisfactory appearance of the fired composition is also important.

On the other hand, when the dispersion is to be applied as a thick film paste, conventional thick film organic media can be used with appropriate rheological adjustments and the use of lower volatility solvents.

In view of all these criteria, a wide variety of inert liquids can be used as organic medium. The organic medium for most thick film compositions is typically a solution of resin in a solvent and, frequently, a solvent solution containing both resin and thixotropic agent. The solvent usually boils within the range of 130°–350° C.

Especially suitable resins for this purpose are polymethyacrylates of lower alcohols and monobutyl ether of ethylene glycol monoacetate.

The most widely used solvents for thick film applications are terpenes such as alpha- or beta-terpineol or mixtures thereof with other solvents such as kerosene, dibutylphthalate, butyl carbitol, butyl carbitol acetate, hexylene glycol and high boiling alcohols and alcohol esters. Various combinations of these and other solvents are formulated to obtain the desired viscosity and volatility requirements for each application.

Among the thixotropic agents which are commonly used are hydrogenated castor oil and derivatives thereof. It is, of course, not always necessary to incorporate a thixotropic agent since the solvent/resin properties coupled with the shear thinning inherent in any suspension may alone be suitable in this regard.

The ratio of organic medium to inorganic solids in the dispersions can vary considerably and depends upon the manner in which the dispersion is to be applied and the kind of organic medium used. Normally, to achieve good coverage, the dispersions will contain complementally by weight 60–90% solids and 40–10% organic medium. Such dispersions are usually of semifluid consistency and are referred to commonly as "pastes".

The pastes are conveniently prepared on a three-roll mill. The viscosity of the pastes is typically within the following ranges when measured at room temperature on Brookfield viscometers at low, moderate and high shear rates:

| Shear Rate (Sec$^{-1}$) | Viscosity (Pa.s) | |
| --- | --- | --- |
| 0.2 | 100–5000 | — |
| | 300–2000 | Preferred |
| | 600–1500 | Most Preferred |
| 4 | 40–400 | — |
| | 100–250 | Preferred |
| | 140–200 | Most preferred |
| 384 | 7–40 | — |
| | 10–25 | Preferred |
| | 12–18 | Most preferred |

The amount and type of organic medium (vehicle) utilized is determined mainly by the final desired formulation viscosity and print thickness.

As discussed hereinabove, the organic medium will frequently also contain a small amount, relative to the binder polymer, of a plasticizer which serves to lower the $T_g$ of the binder polymer. However, the use of such materials should be minimized in order to reduce the amount of organic materials which must be removed when the films cast therefrom are fired. The choice of plasticizers is, of course, determined primarily by the polymer which must be modified. Among the plasticizers which have been used in various binder systems are diethyl phthalate, dibutyl phthalate, dioctyl phthalate, butyl benzyl phthalate, alkyl phosphates, polyalkylene glycols, glycerol, poly (ethylene oxides, hydroxy ethylated alkyl phenol, dialkyldithiophosphonate and poly (isobutylene). Of these, butyl benzyl phthalate is most frequently used in acrylic polymer systems because it can be used effectively in relatively small concentrations. The amount of plasticizer used in the composition of the invention depends, of course, on the effectiveness of the particular plasticizer to reduce the $T_g$ of the polymer in which it is used as well as the relative degree of $T_g$ change which is required of the polymer in which it is used. Thus, the amount of plasticizer can vary from 0 to as high as 75% wt., basis polymer.

TEST PROCEDURES

In the examples below, the following test procedures were used to determine the properties of the polymeric binder of the compositions of the invention and the green tapes made therefrom.

A. Molecular Weights

Weight average and number average molecular weights were determined on a solution of test polymer dissolved in histological grade tetrahydrofuran using a Waters chromatography system comprising a Model 6000A pump, Model 401 R1 detector and a set of four μ-Styrogel columns ($10^5$, $10^4$, $5 \times 10^2$ and $10^2$). The calibration standard polymer was a poly (methyl methacrylate), Lucite ®40. (Lucite ® is a trademark of E. I. du Pont de Nemours and Company, Inc., Wilmington, DE. for acrylic resins.)

B. Viscosity

All slip viscosity measurements were made on a Brookfield LVT Viscometer, No. 2 spindle, at 6 RPM and a temperature of 25° C.

C. Glass Transition Temperature

The glass transition temperature ($T_g$) of the binder polymers, whether plasticized or not, was determined using a Du Pont Model 990 thermal analyzer coupled to a Du Pont Model 951 thermogravimetric analyzer module.

FORMULATION OF CASTING SLIPS

In the examples which follow, the organic medium used in preparing the casting slips had the following compositions:

TABLE 1

| SLIP COMPOSITIONS | | |
| --- | --- | --- |
| Component | A | B |
| Polymer | 12.15 | 12.71 |
| Methyl Ethyl Ketone | 28.35 | 29.67 |
| Santicizer ® 160[1] | 2.94 | 3.08 |
| 1,1,1-Trichloroethane | 52.12 | 54.54 |
| Polypale ® Resin[2] (10% wt.) | 0.44 | — |
| Isopropanol | 4.00 | — |
| | 100.0 | 100.0 |

[1]Trademark of Monsanto Chemical Co., St. Louis, MO for butyl benzyl phthalate.
[2]Trademark of Hercules, Inc., Wilmington, DE for partially polymerized resin.

The following ceramic dielectric materials were used in the examples:

(1) CL750 is an NPO-type dielectric material based on $BaTiO_3$ and $NbTiO_3$ also containing bismuth.
(2) BL162 is a BX/X7R-type bismuth-containing dielectric material based on $BaTiO_3$; and
(3) H602 is a Z5U-type bismuth-free dielectric material based on $BaTiO_3$.

The above described three dielectric materials are products of Solid State Dielectrics, a division of E. I. du Pont de Nemours and Company Inc., Wilmington, DE.

In making casting slips, organic medium, ceramic powder and mixed flint pebbles are added to a ceramic jar and milled for 14 hours. The milled dispersion is transferred from the mill jar to a glass jar which is placed in a constant temperature bath or oven for a time sufficient to bring the temperature of the slip to 25° C. Slip viscosities are measured at 25° C.

In the examples which follow, all compositional proportions are given in % by weight (% wt.) unless otherwise indicated.

EXAMPLES

Examples 1-3

A series of three casting slips was prepared from acidic acrylic terpolymers in which the amount of acidic comonomer was varied from 0.4 to 1.8%. Using the above-described procedure and proportions, casting slips were prepared for each terpolymer and the viscosity of the slips was measured.

TABLE 2

EFFECT OF POLYMER ACID CONTENT ON SLIP VISCOSITY

| EXAMPLE NO. | 1 | 2 | 3 |
|---|---|---|---|
| Polymer Composition | | | |
| Ethyl Methacrylate | 62.3 | 61.9 | 61.6 |
| Methyl Acrylate | 37.1 | 36.9 | 36.6 |
| Methacrylic Acid | 0.6 | 1.2 | 1.8 |
| Polymer Properties | | | |
| $T_g$ (°C.) | 35 | 32 | 38 |
| $M_n$ | 80,000 | 73,000 | 75,800 |
| $M_w$ | 266,000 | 272,000 | 250,000 |
| $M_w/M_n$ | 3.3 | 3.8 | 3.3 |
| Slip Viscosity (Pa.s) | 0.42 | 0.80 | 4–19 |

The above data show that the slip prepared from the high acid polymer had a quite unstable and very high viscosity, which was due to the tendency of the dielectric solids to flocculate. By contrast, the two low acid polymers exhibited quite stable low viscosities. For this reason, the polymer binder component of the invention preferably should contain no more than 1.5% wt. comonomers having pendant functional groups.

Examples 3-6

Three polymers having the same composition as those of claim 1 were each cast from a 30% wt. solution in methyl ethyl ketone onto a glass plate to form a clear film of 6 mils wet thickness. The clear films were then dried at room temperature for 48-72 hours after which the dried films were 1-1.5 mils in thickness. Tensile specimens ½×2½ inches (1.27×6.35 cm) were cut and tested on an Instron testing machine at a pull rate of 2 inches/sec (5.1 cm/sec). These data are shown in Table 3 below:

TABLE 3

EFFECT OF MOLECULAR WEIGHTS AND MOLECULAR WEIGHT DISTRIBUTION ON TENSILE PROPERTIES OF BINDER POLYMER

| EXAMPLE NO. | 4 | 5 | 6 |
|---|---|---|---|
| Polymer Composition | | | |
| Ethyl Methacrylate | 62.3 | 61.9 | 62.6 |
| Methyl Acrylate | 37.1 | 36.9 | 36.8 |
| Methacrylic Acid | 0.6 | 1.2 | 1.6 |
| Polymer Properties | | | |
| $T_g$ (°C.) | 35 | 32 | 38 |
| $M_n$ | 80,000 | 73,000 | 73,000 |
| $M_w$ | 266,000 | 272,000 | 450,000 |
| $M_w/M_n$ | 3.3 | 3.8 | 6.2 |
| Solution Viscosity (Pa.s) | 0.46 | 0.40 | 1.8 |
| Clear Film Properties | | | |
| Modulus, Lbs./in.$^2$ | 52,000 | 48,000 | 34,000 |
| Elongation at Break, % | 178 | 128 | 19 |
| Break Stress, lbs./in.$^2$ | 2,100 | 1,400 | 3,400 |
| Break Energy, ft. lb. | 0.32 | 0.27 | 0.04 |

The above data show that the polymers of the invention (Examples 4 and 5) have considerably higher flexibility, elongation at break and toughness (break energy) despite the fact that their weight average molecular weight was considerably lower than the polymer of Example 6. Solution viscosity of the polymers used in the invention were also considerably lower.

Examples 7 and 8

Polymers similar to those of Examples 4 and 6 were used to form two castable slips as described above. The composition of both castable slips was the same with respect to the amount of solids, plasticizer and solvent. Both of the slips were then cast to form a green tape. Tensile specimens of the same size as in Examples 4–6 were prepared and were laminated without electrodes to form a 15-layer laminate, which was tested for its tensile properties in the same manner as Examples 4–6. These data are shown in Table 4 below:

TABLE 4

EFFECT OF MOLECULAR WEIGHTS AND MOLECULAR WEIGHT DISTRIBUTION ON TENSILE PROPERTIES OF LAMINATED GREEN TAPE

| EXAMPLE NO. | 7 | 8 |
|---|---|---|
| Polymer Composition | | |
| Ethyl Methacrylate | 62.3 | 62.6 |
| Methyl Acrylate | 37.1 | 36.8 |
| Methacrylic Acid | 0.6 | 0.6 |
| Polymer Properties | | |
| $T_g$ (°C.) | 35 | 38 |
| $M_n$ | 80,000 | 73,000 |
| $M_w$ | 266,000 | 450,000 |
| $M_w/M_n$ | 3.3 | 6.2 |
| Solution Viscosity (Pa.s) | 0.46 | 1.8 |
| Slip Composition | | |
| BL-162 | 71.4 | 65.2 |
| Polymer | 3.5 | 4.2 |
| Methyl Ethyl Ketone | 8.0 | 9.7 |
| Santicizer ® 160 | 0.8 | 1.0 |
| 1,1,1-Trichloroethane | 14.9 | 17.9 |
| Polypale ® Resin | 0.1 | 0.2 |
| Isopropanol | 1.3 | 1.8 |
| | 100.0 | 100.0 |
| Slip Viscosity, cps | 612 | 694 |
| Laminated Green Tape Properties | | |
| Modulus, lbs./in.$^2$ | 2.5 | 3.6 |
| Elongation at Break, % | 36 | 28 |
| Break Stress, lbs./in.$^2$ | 224 | 235 |
| Break Energy, ft. lb. | 0.12 | 0.09 |

These data show that green tapes made from the castable slips of the invention have higher flexibility as indicated by elongation at break and also higher toughness, as shown by the break energy.

Examples 9-11

A further series of three castable ceramic slips was prepared in which the viscosity of each of the slips was 600-650 cps. The castable slips were prepared from three different acrylic polymers using identical dielectric solids. Green tape was cast from each of the three slips which were air dried at room temperature for 36-48 hours. The data in Table 5 below show that the composition of the invention at comparable viscosity (Example 9 contained a significantly higher amount of dielectric as compared to the composition using a conventional polymeric binder (Examples 10 and 11). In addition, Example 11 shows that, because of higher Tg, more plasticizer is necessary to insure good laminant bonding. It can be seen from Example 11 that castable slips of adequate dispersibility can be obtained from acrylic polymers without acid groups. However, to have such dispersibility, they must be of very high molecular weight, for which reason they are not suitable for use in the compositions of the invention.

TABLE 5
EFFECT OF MOLECULAR WEIGHTS AND MOLECULAR WEIGHT DISTRIBUTION ON SLIP SOLIDS CONTENT

| EXAMPLE NO. | 9 | 10 | 11 |
|---|---|---|---|
| Polymer Composition | | | |
| Ethyl Methacrylate | 62.3 | 62.6 | — |
| Methyl Acrylate | 37.1 | 36.8 | — |
| Ethyl Acrylate | — | — | 29.0 |
| Methyl Methacrylate | — | — | 71.0 |
| Methacrylic Acid | 0.6 | 0.6 | — |
| | 100.0 | 100.0 | 100.0 |
| Polymer Properties | | | |
| $T_g$ (°C.) | 35 | 38 | 54 |
| $M_n$ | 80,000 | 73,000 | 300,000 |
| $M_w$ | 266,000 | 450,000 | 744,000 |
| $M_w/M_n$ | 3.3 | 6.2 | 2.5 |
| Slip Composition | | | |
| BL162 | 62.0 | 55.6 | 44.9 |
| Polymer | 4.8 | 5.1 | 5.0 |
| Plasticizers | 1.2 | 1.4 | 4.0 |
| Solvent | 32.0 | 37.9 | 46.1 |
| | 100.0 | 100.0 | 100.0 |
| Slip Viscosity (cps) | 650 | 610 | 630 |
| Dry Tape Composition | | | |
| Dielectric Solids | 91.2 | 89.5 | 83.2 |
| Organics | 8.8 | 10.5 | 16.8 |

Examples 12-20

A series of nine castable slip compositions was prepared which illustrates how much more ceramic solids can be incorporated into the composition of the invention as compared with compositions containing commercially available polymers which do not meet the molecular weight relationships of the invention.

TABLE 6
EFFECT OF MOLECULAR WEIGHTS AND MOLECULAR WEIGHT DISTRIBUTION ON SLIP SOLIDS CONTENT

| EXAMPLE NO. | 12 | 13 | 14 |
|---|---|---|---|
| Polymer Composition | | | |
| Ethyl Methacrylate | 62.3 | 62.3 | 62.3 |
| Methyl Acrylate | 37.1 | 37.1 | 37.1 |
| Methacrylic Acid | 0.6 | 0.6 | 0.6 |
| Polymer Properties | | | |
| $T_g$ | 35 | 35 | 35 |
| $M_n$ | 80,000 | 80,000 | 80,000 |
| $M_w$ | 266,000 | 266,000 | 266,000 |
| $M_w/M_n$ | 3.3 | 3.3 | 3.3 |
| Slip Composition (pbw) | | | |
| Ceramic Solids[1] | 200 | 220 | 240 |
| Binder Polymer | 9.9 | 9.9 | 9.9 |
| Solvent[2] | 77.0 | 77.0 | 77.0 |
| Plasticizer[3] | 2.7 | 2.7 | 2.7 |
| Viscosity Reducing Agent | 0.4 | 0.4 | 0.4 |
| Ceramic Solids Conc., % | 69.0 | 71.0 | 72.7 |
| Slip Viscosity, cps | 590 | 760 | 1000 |
| Green Tape Composition (% wt.) | | | |
| Ceramic Solids | 93.9 | 94.4 | 94.9 |
| Organic Solids | 6.1 | 5.6 | 5.1 |

| EXAMPLE NO. | 15 | 16 | 17 |
|---|---|---|---|
| Polymer Composition | | | |
| Ethyl Methacrylate | 62.6 | 62.6 | 62.6 |
| Methyl Acrylate | 36.8 | 36.8 | 36.8 |
| Methacrylic Acid | 0.6 | 0.6 | 0.6 |
| Polymer Properties | | | |
| $T_g$ | 38 | 38 | 38 |
| $M_n$ | 73,000 | 73,000 | 73,000 |
| $M_w$ | 450,000 | 450,000 | 450,000 |
| $M_w/M_n$ | 6.2 | 6.2 | 6.2 |
| Slip Composition (pbw) | | | |
| Ceramic Solids[1] | 160 | 167 | 180 |
| Binder Polymer | 9.9 | 9.9 | 9.9 |
| Solvent[2] | 77.0 | 77.0 | 77.0 |
| Plasticizer[3] | 2.7 | 2.7 | 2.7 |
| Viscosity Reducing Agent[4] | 0.4 | 0.4 | 0.4 |
| Ceramic Solids Conc., % | 64.0 | 65.0 | 66.7 |
| Slip Viscosity, cps | 840 | 1000 | 1280 |
| Green Tape Composition (% wt.) | | | |
| Ceramic Solids | 92.6 | 92.8 | 93.3 |
| Organic Solids | 7.4 | 7.2 | 6.7 |

| EXAMPLE NO. | 18 | 19 | 20 |
|---|---|---|---|
| Polymer Composition | | | |
| Ethyl Methacrylate | 62.6 | 62.6 | 62.6 |
| Methyl Acrylate | 36.8 | 36.8 | 36.8 |
| Methacrylic Acid | 0.6 | 0.6 | 0.6 |
| Polymer Properties | | | |
| $T_g$ | 38 | 38 | 38 |
| $M_n$ | 73,000 | 73,000 | 73,000 |
| $M_w$ | 450,000 | 450,000 | 450,000 |
| $M_w/M_n$ | 62 | 62 | 62 |
| Slip Composition (pbw) | | | |
| Ceramic Solids[1] | 200 | 220 | 240 |
| Binder Polymer | 9.9 | 9.9 | 9.9 |
| Solvent[2] | 77.0 | 77.0 | 77.0 |
| Plasticizer[3] | 2.7 | 2.7 | 2.7 |
| Viscosity Reducing Agent[4] | 0.4 | 0.4 | 0.4 |
| Ceramic Solids Conc., % | 69.0 | 71.0 | 72.7 |
| Slip Viscosity, cps | 1750 | 2400 | 4800 |
| Green Tape Composition (% wt.) | | | |
| Ceramic Solids | 93.8 | 94.4 | 94.9 |
| Organic Solids | 6.1 | 5.6 | 5.1 |

[1]BL162
[2]Solvent is mixture of 23.0 methyl ethyl ketone, 50.4 1,1,1-trichloroethane, 3.6 isopropanol.
[3]Santicizer ® 160
[4]Polypale ® resin It is interesting to note from the above data that at a ceramic loading of 200 pbw, the casting slip using the polymer which did not meet the criteria of the invention had a viscosity of 1750 cps as compared to only 590 for the composition of the invention. Similarly, at a loading of 240 pbw, the casting slip using conventional carboxylated polymers had a viscosity of 4800 cps as compared to only 1000 for the composition of the invention. On the basis of equal viscosity (1000 cps), the data show that almost 44% more solids can be incorporated into the casting slip in which the binder polymer meets the criteria of the invention. Furthermore, the amount of organic materials which must be removed by pyrolysis is reduced by 29%.

Examples 21–26

A further series of castable slips was prepared in order to study the effect on slip viscosity of increasing the concentration of the viscosity reducing agents. In addition, the effect of such viscosity reducing agents on the slip viscosity was observed at constant concentration on two further compositions, only one of which was based on a binder polymer meeting the criteria of the invention.

TABLE 7
EFFECT OF DISPERSION AGENT CONCENTRATION ON SLIP VISCOSITY

| EXAMPLE NO. | 21 | 22 | 23 |
|---|---|---|---|
| Polymer Composition | | | |
| Ethyl Methacrylate | 62.3 | 62.3 | 62.3 |
| Methyl Acrylate | 37.1 | 37.1 | 37.1 |
| Methacrylic Acid | 0.6 | 0.6 | 0.6 |
| Polymer Properties | | | |
| $T_g$ (°C.) | 35 | 35 | 35 |
| $M_n$ | 80,000 | 80,000 | 80,000 |
| $M_w$ | 266,000 | 266,000 | 266,000 |
| $M_w/M_n$ | 3.3 | 3.3 | 3.3 |
| Slip Composition (pbw) | | | |
| Dielectric Solids[1] | 600 | 600 | 600 |
| Binder Polymer | 47 | 38 | 37 |
| Viscosity Reducing Agent[2] | — | 0.7 | 1.5 |
| Solvent[3] | 310 | 252 | 252 |
| Plasticizer[4] | 11 | 9 | 9 |
| Slip Viscosity, Pa.s | | | |
| 0.6 RPM | 0.9 | 0.6 | 0.3 |
| 12.0 RPM | 1.0 | 0.8 | 0.5 |

| EXAMPLE NO. | 24 | 25 | 26 |
|---|---|---|---|
| Polymer Composition | | | |
| Ethyl Methacrylate | 62.3 | 62.3 | 100.0 |
| Methyl Acrylate | 37.1 | 37.1 | |
| Methacrylic Acid | 0.6 | 0.6 | — |
| Polymer Properties | | | |
| $T_g$ (°C.) | 35 | 35 | 66 |
| $M_n$ | 80,000 | 80,000 | 93,000 |
| $M_w$ | 266,000 | 266,000 | 341,000 |
| $M_w/M_n$ | 3.3 | 3.3 | 3.7 |
| Slip Composition (pbw) | | | |
| Dielectric Solids[1] | 600 | 720 | 600 |
| Binder Polymer | 35 | 30 | 37 |
| Viscosity Reducing Agent[2] | 3.0 | 1.5 | 1.5 |
| Solvent[3] | 252 | 252 | 252 |
| Plasticizer[4] | 9 | 9 | 9 |
| Slip Viscosity, Pa.s | | | |
| 0.6 RPM | 8.3 | 1.0 | 55.0 |
| 12.0 RPM | 1.7 | 0.9 | 10.0 |

[1]H602
[2]Polypale ® resin
[3]Mixture of MEK, TCE and isopropanol
[4]Santicizer ® 160

The data here show that the viscosity reducing agent is effective in small concentration to reduce slip viscosity, but at a level of 3.0 g (0.5% wt. of dielectric solids) caused destabilization of the dispersion which resulted in higher viscosity, unstable viscosity and flocculation of solids. It was quite interesting to note, however, that this tolerance for effective use of viscosity reducing agents was even less for the casting slip which utilized a binder polymer having no acid functionality (Example 26).

Examples 27–31

The importance of the molecular weights and the ratio of weight average weight to number average molecular weight is shown by the following examples in which a series of five polymers was used to prepare clear films in the manner described in Examples 3–6. The clear polymer film of Example 27, which meets the criteria of the invention, was quite tough in that when the specimens were folded 180° five times, they did not crack. Example 28, which does not meet the molecular weight criteria of the invention, had good toughness properties but excessive solution viscosity. On the other hand, the film of Examples 29–31, which also do not meet the criteria of the invention, were very brittle. That is, when they were folded, they cracked. It has been found that the brittleness of cast films is reflected in the cuttability of MLC's made from their corresponding castable slips.

TABLE 8
EFFECT OF MOLECULAR WEIGHT AND MOLECULAR WEIGHT DISTRIBUTION ON PROPERTIES OF BINDER POLYMER

| EXAMPLE NO. | 27 | 28 | 29 | 30 | 31 |
|---|---|---|---|---|---|
| Polymer Composition | | | | | |
| Ethyl Methacrylate | 62.3 | 62.6 | 64.0 | — | 59.0 |
| Methyl Methacrylate | — | — | — | 39.5 | — |
| Butyl Acrylate | — | — | — | — | 39.0 |
| Butyl Methacrylate | — | — | — | 60.0 | — |
| Methyl Acrylate | 37.1 | 36.8 | 36.0 | — | — |
| Methacrylic Acid | 0.6 | 0.6 | 0.6 | 0.5 | 2.0 |
| Polymer Properties | | | | | |
| $T_g$ (°C.) | 35 | 38 | 40 | 50 | 47 |
| $M_n$ | 80,000 | 67,000 | 19,000 | 22,500 | 18,000 |
| $M_w$ | 266,000 | 455,000 | 81,000 | 67,200 | 36,000 |
| $M_w/M_n$ | 3.3 | 6.8 | 4.2 | 3.0 | 2.0 |
| Solution[1] Viscosity | 0.45 | 2.1 | 0.07 | 0.05 | 0.05 |

[1]Polymer in MEK Solvent

Examples 32–35

A series of four casting slips was prepared in the manner described above. In one, Polypale ® resin viscosity reducing agent was added; in two others, a small amount of glacial acetic acid was added; and the fourth was a control composition containing neither additive. Upon testing the viscosity of the four slips, it was found that the glacial acetic acid was also effective in lowering the viscosity of the casting slip.

TABLE 9
EFFECT OF ACID ADDITION ON SLIP VISCOSITY

| | EXAMPLE NO. | | | |
|---|---|---|---|---|
| | 32 | 33 | 34 | 35 |
| Polymer Composition | | | | |
| Ethyl Methacrylate | 62.3 | 62.3 | 62.3 | 62.3 |
| Methyl Acrylate | 37.1 | 37.1 | 37.1 | 37.1 |
| Methacrylic Acid | 0.6 | 0.6 | 0.6 | 0.6 |
| Polymer Properties | | | | |
| $T_g$ (°C.) | 35 | 35 | 35 | 35 |
| $M_n$ | 80,000 | 80,000 | 80,000 | 80,000 |
| $M_w$ | 266,000 | 266,000 | 266,000 | 266,000 |
| $M_w/M_n$ | 3.3 | 3.3 | 3.3 | 3.3 |
| Slip Composition | | | | |
| Dielectric Solids[1] | 200 | 200 | 200 | 200 |
| Binder Polymer | 12.4 | 12.4 | 12.4 | 12.4 |
| Solvent | 82.2 | 82.2 | 82.2 | 82.2 |
| Plasticizer | 3.0 | 3.0 | 3.0 | 3.0 |
| Polypale ® Resin | — | 0.2 | — | — |
| Glacial Acetic Acid | — | — | 0.2 | 0.1 |

TABLE 9-continued

EFFECT OF ACID ADDITION ON SLIP VISCOSITY

| | EXAMPLE NO. | | | |
|---|---|---|---|---|
| | 32 | 33 | 34 | 35 |
| Slip Viscosity, cps | 2.92 | 1.78 | 1.66 | 1.95 |

(1)H6O2

Examples 36-46

A further series of compositions was prepared for a wide variety of polymer compositions and subjected to a dispersion test for the purpose of preliminarily screening the suitability of each polymer for use in casting slips. In the dispersion test, 4.5 g ceramic powder (BL 162), 45.0 g of xylene or 1,1,1-trichloroethane and 50 g of polymer solution (30% polymer in MEK) were added to a suitably sized bottle, shaken on a mechanical paint shaker for 30 minutes and then allowed to stand quietly for 8 hours. After the 8-hour period expired, the sample was observed as to turbidity or clearness. The turbid samples were thereby shown to be well dispersed, while the clear samples were plainly shown to be unstable and, thus, lacking in the required dispersibility.

TABLE 10
EFFECT OF POLYMER COMPOSITION ON SLIP STABILITY

| EXAMPLE NO. | 36 | 37 | 38 | 39 | 40 | 41 |
|---|---|---|---|---|---|---|
| Polymer Composition | | | | | | |
| Methyl Methacrylate | — | — | 82.0 | 40.0 | 35.0 | 35.0 |
| Ethyl Methacrylate | 62.3 | 62.3 | — | — | — | — |
| Butyl Methacrylate | — | — | — | — | 9.0 | 9.0 |
| Methyl Acrylate | 37.1 | 36.8 | — | — | — | — |
| Ethyl Acrylate | — | — | — | — | — | — |
| Butyl Acrylate | — | — | 18.0 | 60.0 | 46.0 | 46.0 |
| 2-Ethylhexyl Acrylate | — | — | — | — | — | — |
| Methacrylic Acid | 0.6 | 0.6 | — | — | 10.0 | — |
| Methacrylic Acid, Iminated | — | — | — | — | — | 10.0 |
| Diethylaminoethyl Methacrylate | — | — | — | — | — | — |
| Glycidyl Methacrylate, Ammoniated | — | — | — | — | — | — |
| Dispersion Stability | | | | | | |
| Good | X | X | — | — | X | X |
| Settled | — | — | X | X | — | — |

| EXAMPLE NO. | 42 | 43 | 44 | 45 | 46 |
|---|---|---|---|---|---|
| Polymer Composition | | | | | |
| Methyl Methacrylate | 32.5 | 81.0 | 70.0 | — | 61.5 |
| Ethyl Methacrylate | — | — | — | — | — |
| Butyl Methacrylate | 64.0 | — | 30.0 | — | — |
| Methyl Acrylate | — | — | — | — | — |
| Ethyl Acrylate | — | — | — | 13.0 | 38.0 |
| Butyl Acrylate | — | 18.0 | — | — | — |
| 2-Ethylhexyl Acrylate | — | — | — | 87.0 | — |
| Methacrylic Acid | — | — | — | — | 0.5 |
| Methacrylic Acid, Iminated | — | — | — | — | — |
| Diethylaminoethyl Methacrylate | — | 1.0 | — | — | — |
| Glycidyl Methacrylate, Ammoniated | 3.5 | — | — | — | — |
| Dispersion Stability | | | | | |
| Good | X | X | — | — | X |
| Settled | — | — | X | X | — |

Examples 38, 39, 44 and 45 illustrate that good dispersibility cannot be obtained without pendant claim functionality. Examples 41-43 illustrate that amine groups as well as acid groups can be used to obtain good dispersibility.

Examples 47

A further series of slip compositions was prepared from a similarly wide variety of polymer compositions. Each of the slips was subjected to the turbidity test of Examples 36-46 and the viscosity of each was measured by means of an Haake Rotoviseo RV 3 viscometer, both initially and after storage at 40° C. for 2 weeks.

TABLE 11
EFFECT OF HEAT AGING ON VISCOSITY OF CASTING SLIPS

| EXAMPLE NO. | 47 | 48 | 49 | 50 |
|---|---|---|---|---|
| Polymer Composition | | | | |
| Methyl Methacrylate | — | — | 61.5 | 67.0 |
| Ethyl Methacrylate | 62.3 | 62.6 | — | — |
| Methyl Acrylate | 37.1 | 36.8 | — | — |
| Ethyl Acrylate | — | — | 38.0 | — |
| Butyl Acrylate | — | — | — | — |
| 2-Ethylhexyl Acrylate | — | — | — | 31.0 |
| Methacrylic Acid | 0.6 | 0.6 | 0.5 | 2.0 |
| Methacrylic Acid, Iminated | — | — | — | — |
| Diethylaminoethyl Methacrylate | — | — | — | — |
| Glycidyl Methacrylate, Ammoniated | — | — | — | — |
| Dispersion Stability | | | | |
| Turbidity - Good | X | X | X | X |
| Settled | | | | |
| Haake Viscosity Stability(1) | NC | NC | NC | NC |

| EXAMPLE NO. | 51 | 52 | 53 | 54 |
|---|---|---|---|---|
| Polymer Composition | | | | |
| Methyl Methacrylate | 81.0 | 81.0 | 81.0 | 71.0 |
| Ethyl Methacrylate | — | — | — | — |
| Methyl Acrylate | — | — | — | — |
| Ethyl Acrylate | — | 14.6 | 14.6 | 29.0 |
| Butyl Acrylate | 18.0 | — | — | — |
| 2-Ethylhexyl Acrylate | — | — | — | — |
| Methacrylic Acid | — | 4.4 | — | — |
| Methacrylic Acid, Iminated | — | — | 4.4 | — |
| Diethylaminoethyl Methacrylate | 1.0 | — | — | — |
| Glycidyl Methacrylate Ammoniated | — | — | — | — |
| Dispersion Stability | | | | |
| Turbidity - Good | X | X | X | — |
| Settled | | | | X |
| Haake Viscosity Stability(1) | NC | I | — | NC |

(1)NC - No change, I - Significant change

Example 52 shows that too much pendant functionality is detrimental to dispersion stability as shown by the Haake Viscosity Stability Test. Example 54 shows that lack of pendant functionality is also detrimental to dispersion stability even though viscosity of the casting slip remains stable upon heat aging. The casting slips prepared from polymers meeting the compositional parameters of the invention (Examples 47-51) exhibited both good dispersion and viscosity stability.

Example 56

A still further slip composition was prepared in which the solvent contained sufficient trichlorotrifluoroethane to give the slip composition a closed cup flashpoint (ASTM Test Method D56) of over 200° C. A 4-mils thick tape was cast therefrom using the procedure described above. The tape was found to be appropriately strong and had no pinholes. In addition, the thickness of the tape was uniform and it laminated well when it was used to make MLC's. The slip had the following composition:

| Nonflammable Slip Composition | |
| --- | --- |
| Glass Powder | 32.2% wt. |
| $Al_2O_3$ | 16.5 |
| $SiO_2$ | 4.0 |
| Polymer[1] | 3.5 |
| Dioctyl phthalate | 1.3 |
| 1,1,1-trichloroethane | 33.2 |
| Methylene chloride | 2.0 |
| 2-Propanol | 1.7 |
| Trichlorotrifluoroethane | 3.0 |
| Methyl Ethyl Ketone | 2.3 |

[1] 62.3/37.1/0.6 ethyl methacrylate/methyl acrylate (methacrylic acid)

Examples 57–61

To observe the effect of plasticizer upon the glass transition temperature ($T_g$) of the polymers which are used in the invention, four solutions of plasticizer and polymer were prepared in which the amount of plasticizer was as high as 100% wt. basis polymer. The solutions were prepared by the addition of plasticizer to a solution of the polymer, followed by removal of the solvent. The data given in Table 12 below show that quite substantial changes in $T_g$ can be obtained using as much as equal amounts of plasticizer and polymer.

TABLE 12

EFFECT OF PLASTICIZER ON GLASS TRANSITION TEMPERATURE OF BINDER POLYMERS

| Example No. | Polymer[2] (Parts By Wt.) | Plasticizer[3] (Parts By Wt.) | $T_g$ (°C.) |
| --- | --- | --- | --- |
| 57 | 100 | — | 33 |
| 58 | 100 | 24 | −6 |
| 59 | 100 | 50 | −23 |
| 60 | 100 | 25 | −44 |
| 61 | 100 | 100 | −47 |

[2] 62.3/37.1/0.6 ethyl methacrylate/methyl acrylate/methacrylic acid.
[3] Butyl benzyl phthalate.

I claim:
1. An organic medium for the dispersion of inorganic solids consisting essentially of
   a. a mixture of compatible polymers of 0–100% wt. $C_{1-8}$ alkyl methacrylate, 100–0% wt. $C_{1-8}$ alkyl acrylate and 0–5% ethylenically unsaturated carboxylic acid or ethylenically unsaturated amine dissolved in
   b. a nonaqueous organic solvent, the polymers being further characterized as having a number average molecular weight ($M_n$) of 50,000 to 100,000, a weight average molecular weight ($M_w$) of 150,000 to 350,000, the ratio of $M_w$ to $M_n$ being no greater than 5.5, the total amount of unsaturated carboxylic acid or unsaturated amine in the polymer mixture is 0.2–2.0% wt. and the glass transition temperature of the polymer and plasticizer therein, if any, is −30° to +45° C.
2. The organic medium of claim 1 in which the alkyl methacrylate is ethyl methacrylate and the alkyl acrylate is methyl acrylate.
3. The organic medium of claim 2 in which the ethylenically unsaturated carboxylic acid is a monocarboxylic acid selected from the group consisting of acrylic acid, methacrylic acid and mixtures thereof.
4. The organic medium of claim 3 in which the carboxylic acid is methacrylic acid.
5. The organic medium of claim 1 in which the ethylenically unsaturated carboxylic acid is dicarboxylic acid selected from the group consisting of itaconic acid, fumaric acid, maleic acid, maleic anhydride, and half esters and mixtures thereof.
6. The organic medium of claim 1 in which the compatible polymers contain 40–80% wt. alkyl methacrylate and 60–20% wt. alkyl acrylate.
7. The organic medium of claim 1 in which the weight ratio of alkyl methacrylate to alkyl acrylate is 1.5–2.5:1.
8. The organic medium of claim 1 in which $M_n$ is 60,000–80,000 and $M_w$ is 200,000–300,000.

* * * * *